United States Patent

[11] 3,624,130

[72] Inventors Kurt Klemm
 Konstanz;
 Wolfgang Pruesse, Konstanz; Wolfgang Schoetensack, Hegne; Erhard Langenscheid, Konstanz; Juergen Vogel, Konstanz, all of Germany
[21] Appl. No. 521,490
[22] Filed Jan. 19, 1966
[45] Patented Nov. 30, 1971
[73] Assignee Byk-Gulden Lomberg, Chemische Fabrik G.m.b.H.
 Konstanz/ Bodensee, Germany
[32] Priority Jan. 22, 1965
[33] Germany
[31] B 80231

[54] SUBSTITUTED MALONIC ACID HYDRAZIDES AND PROCESS OF MAKING SAME
27 Claims, No Drawings

[52] U.S. Cl. .................................................... 260/471 A,
 71/88, 71/98, 71/111, 71/115, 260/347.4,
 260/399, 260/404, 260/413, 260/470, 260/471 C,
 260/518 R, 260/518 A, 260/519, 260/544 M,
 260/544 Y, 424/285, 424/300, 424/309, 424/319

[51] Int. Cl. ................................................... C07c 125/04
[50] Field of Search ........................................... 260/471 A,
 518, 518 A, 519, 326.3, 332.2, 290, 294.3, 347.4,
 544 M, 544 Y

[56] References Cited
OTHER REFERENCES

Synthetic Methods of Organic Chemistry, W. Theilheimer, Vol. 9 (1955), p. 211 relied on.

Organic Chemistry, Morrison et al., pgs. 438– 439 and 495 relied on. (1959)

*Primary Examiner*—Lewis Gotts
*Assistant Examiner*—L. Arnold Thaxton
*Attorneys*—Erich M. Radde, Charles A. McClure, Gerard J. Weiser and Alfred Stapler ABSTRACT: Substituted malonic acid hydrazides in which at least one of the hydrogen atoms of the malonic acid moiety is substituted and wherein the hydrazide group contains phenyl substituents attached to the nitrogen atoms, and compositions containing the same; these compounds are useful in weed eradication and in the treatment of arthritis.

SUBSTITUTED MALONIC ACID HYDRAZIDES AND PROCESS OF MAKING SAME

The present invention relates to substituted malonic acid hydrazides and more particularly to malonic acid hydrazides in which at least one of the hydrogen atoms of the malonic acid moiety is substituted and wherein the hydrazide group contains phenyl substituents attached to the nitrogen atoms, to an improved process of making such compounds, to compositions containing the same, and to a process of using such compositions.

It is known that cyclic malonic acid hydrazides of the 3,5-diketo pyrazolidine type have pronounced antiphlogistic, analgesic, and antipyretic properties. The most widely used compound of this type is the 4-n-butyl-3,5-diketo-N,N'-diphenyl pyrazolidine known as phenylbutazone. This compound has been used for many years in therapy for the treatment of gout, arthritis, and similar painful diseases of the joints because it possesses a high analgesic, antipyretic, and antiphlogistic activity.

It is one object of the present invention to provide new and valuable substituted noncyclic malonic acid hydrazides which have a substantially lower toxicity but at least the same or an even better antiphlogistic, analgesic, and antipyretic activity and produce these effects within a shorter period of time than the well-known phenylbutazone.

Another object of the present invention is to provide a simple and effective process of producing such new and valuable compounds.

A further object of the present invention is to provide valuable and highly effective pharmaceutical compositions which can be used as analgesic, antiphlogistic, and antipyretic agents.

Still another object of the present invention is to provide a process of treating humans and animals with such new and valuable compositions containing the new substituted noncyclic malonic acid hydrazides.

A further object of this invention is to provide a composition useful for affecting the growth of plants and for weed eradication.

Another object of the present invention is to provide a process of affecting plant growth and of eradicating weeds in a simple and highly effective manner.

A further object of the present invention is to provide solubilizing aids which are capable of facilitating the dissolution, in water, of compounds which are difficultly soluble in water such as phenol, cresols, xylenols, their chlorination products, and the corresponding diphenyl methane compounds such as hexachlorophene, i.e. 2,2'-methylene-bis-(3,4,6-trichloro phenol), and the like water insoluble and difficultly soluble compounds.

A further object of the present invention is to provide new and valuable stable metal salts of such compounds and especially of their alkali metal salts which possess lipophilic properties and thus are soluble, for instance, in benzene and other hydrocarbons.

Other objects of the present invention and advantageous features thereof will become apparent as the description proceeds.

In principle, the compounds according to the present invention are characterized by the following formula I:

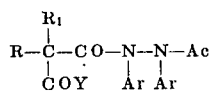

In said formula Ar indicates the phenyl radical or a phenyl radical substituted by halogen, lower alkyl, or lower alkoxy;

Ac indicates an alkanoyl group, the benzoyl group, or the carbobenzyloxy group;

Y indicates halogen, the hydroxyl group, a lower alkoxy group, or the benzyloxy group, and R and $R_1$ indicate straight chain, branched, or cyclic alkyl or alkenyl radicals having up to 10 carbon atoms, whereby the carbon atom chain or ring of said alkyl or alkenyl radicals may be interrupted by an oxygen, sulfur, or nitrogen atom, an aryl radical, or an aralkyl whereby the aromatic ring of said aryl or aralkyl radicals may be substituted by halogen, hydroxyl, lower alkoxy, nitro, amino, or dialkylamino, and wherein one of said R and $R_1$ may be hydrogen.

Especially valuable compounds can be produced from said diacylated compounds by the new and valuable process described hereinafter. Such compounds correspond to the following formula II:

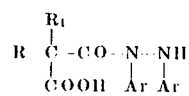

These compounds are obtained by condensing a malonic acid compound of formula III:

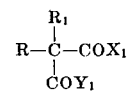

wherein
R and $R_1$ represent the same members as indicated above, while
$X_1$ is halogen, and
$Y_1$ is hydroxyl, lower alkoxy, or benzyloxy with a hydrazine compound of formula IV:

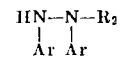

wherein
Ar represents the same members as indicated above, and
$R_2$ is hydrogen, lower alkanoyl with one to six carbon atoms, benzoyl, and α-carbalkoxy alkanoyl, and carbobenzyloxy, in an inert organic solvent at a temperature not substantially exceeding 90° C. If desired, the resulting condensation product may subsequently be saponified and converted into its metal salts and especially into its alkali metal salts.

According to this process the malonic acid compounds of formula III are used in the form of their monohalogenides, preferably in the form of their monochlorides or of their ester chlorides wherein the ester group is a lower alkyl ester group such as the methyl ester group. The other reaction component is a N-monoacyl diaryl hydrazine of formula IV, the aromatic ring of which may be substituted as indicated hereinabove. For instance, when using a monoacyl diaryl hydrazide having an α-carbethoxy caproyl group in its molecule, the corresponding symmetric N,N'-diacyl-diaryl hydrazide is obtained, while when using other monoacyl diaryl hydrazides as the one reactant, asymmetric N,N'-diacyl-diaryl hydrazides, are produced. On subsequent saponification of said hydrazide compounds, not only the acyl group defined as $R_2$ is removed but also the ester group in the malonic acid moiety is saponified. On working up of the saponification mixture there is obtained a compound corresponding to formula II having the substituents present in the starting materials.

Condensation of the reaction components is effected in the presence of an organic solvent which does not participate in or otherwise disturb the reaction. Such solvents are, for instance, halogenated aliphatic hydrocarbons with a boiling point above 50° C., such as chloroform, carbon tetrachloride, 1,2-dichloro ethane, dioxane, tetrahydrofuran, aromatic hydrocarbons such as benzene, toluene, and others. In order to eliminate and bind the hydrogen halide which is set free during said reaction, a basic compound is added which is soluble in the respective reaction medium and which does not participate in the condensation reaction. Suitable basic compounds of this type are, for instance, tertiary amines such as triethylamine, tributylamine, tri-n-octylamine, dimethylaniline, and the like. The condensation temperature is kept between 0° and 90° C. and preferably between 0° and 30° C. The reaction is completed after stirring for several hours whereafter the reaction mixture is worked up and the resulting compounds are isolated, when using, as starting materials, malonic acid monohalogenides, i.e. compounds of formula III, wherein $X_1$ is halogen and $Y_1$ is hydroxyl. When employing ester halogenides, i.e. compounds of formula III, wherein $X_1$ is halogen and $Y_1$ is lower alkoxy, as starting materials, the resulting ester is saponified after working up the reaction mixture. Preferably 14 percent sodium hydroxide or potassium hydroxide solutions are used for saponification, which is advantageously effected by boiling in alcoholic solution in order to provide a homogeneous reaction medium. After saponification for about 1 hour, the malonic acid hydrazide according to the present invention can be recovered from the saponification mixture in a manner known per se.

It has been found that compounds of formula I are also obtained as byproducts, when reacting an ester chloride of formula III with a diaryl hydrazide of formula IV in which $R_2$ is hydrogen, even if substantially equimolecular amounts of the reactants are used. These symmetric diacyl hydrazides of formula I wherein Ac is the acyl group

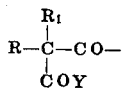

have a structure analogous to that of the main condensation products, the monoacyl hydrazides of formula II. On saponifying the condensation mixture as described hereinabove with alkali metal hydroxide solution in aqueous-alcoholic medium, one of the acyl groups is removed from the symmetric diacyl hydrazide compound of formula I obtained thereby as byproduct, so that, on working up the saponification mixture, said diacyl hydrazide is also converted according to the present invention into the compound of formula II.

Likewise, when reacting a malonic acid ester chloride with a diaryl hydrazide of formula IV in which $R_2$ is hydrogen in the molecular ratio of 2:1, the corresponding diacyl hydrazide of formula I is formed. On saponifying said diacyl hydrazide in aqueous-alcoholic solution, not only one of the acyl groups is removed therefrom but also the ester group in the resulting monoacyl hydrazide compound is saponified so that, on working up the reaction mixture, a substituted malonic acid hydrazide of formula II is obtained.

The compounds according to the present invention possess valuable pharmacological properties and have a high antiphlogistic, analgesic, and antipyretic activity. Especially valuable is the α-carboxy-caproyl-N,N'-diphenyl hydrazide which is considerably less toxic than phenylbutazone and the therapeutic effect of which sets in more rapidly than when administering phenylbutazone.

The following examples serve to illustrate the present invention without, however, limiting the same thereto.

EXAMPLE 1

α-Carboxy-caproyl-N,N'-diphenylhydrazide

To produce butyl malonic acid monochloride, a solution of 20 g. of n-butyl malonic acid, 15.3 g. of thionylchloride, and 26 cc. of anhydrous ether is boiled under reflux for 8 hours and the mixture is allowed to stand for 12 hours. The solvent is removed by careful distillation in a vacuum at 20°-30° C. The residue is dissolved in 240 cc. of chloroform which had previously been distilled over phosphorus pentoxide.

A solution of 15.4 g. of hydrazo benzene and 8.5 g. of triethylamine in 300 cc. of chloroform is added drop by drop to the solution of n-butyl malonic acid monochloride in chloroform at 0°-5° C. within 1 hour while stirring. Stirring of the resulting mixture is then continued at room temperature for 2 to 3 hours. The reaction mixture is shaken three times, each time with 100 cc. of 2N hydrochloric acid and subsequently three times, each time with 100 cc. of water. The remaining organic solvent layer is dried over magnesium sulfate and the solvent is carefully distilled off in a vacuum. 23.4 g. of a red highly viscous oil remain as residue. This oil is dissolved in a small amount of benzene. Petroleum ether is added thereto. The precipitate is filtered off by suction and is dried. nineteen grams of α-carboxy caproyl-N,N'-diphenyl hydrazide melting at 75° C. are obtained. The yield is 69.6 percent of the theoretical yield.

EXAMPLE 2

α-Carboxy-caproyl-N,N'-diphenyl hydrazide

Thirty grams of n-butyl malonic acid ethyl ester chloride are dissolved in 120 cc. of benzene. The solution is added drop by drop to a solution of 12 g. of hydrazobenzene and 16 g. of triethylamine in 80 cc. of benzene within 1 hour while stirring vigorously. The temperature during said addition is kept at 20°-30 C. Stirring of the resulting mixture is continued at 20° C. for about 5 hours. The reaction mixture is shaken with 50 cc. of ice-cold N hydrochloric acid and subsequently with 100 cc. of water. Thereafter, the benzene solution is extracted twice, each time with 50 cc. of N sodium hydroxide solution. The organic solvent layer is separated and the aqueous alkaline solution is strongly acidified by the addition of 2N hydrochloric acid. The acidified solution is extracted twice with 100 cc. each of chloroform. The combined chloroform extracts are washed three times, each time with 150 cc. of water. The washed chloroform solution is dried over calcined magnesium sulfate and is evaporated to dryness by distillation in a vacuum at 30° C. The residue is dissolved in 50 cc. of benzene. Twice its volume of petroleum ether of the boiling point 40°-70° C. is added thereto whereby the N,N'-[bis-(α-carbethoxy caproyl)]-N,N'-diphenyl hydrazide precipitates in crystalline form. By dissolving the crude crystals in a small amount of benzene and again precipitating the reaction product by the addition of an excess of petroleum ether, the reaction product is purified. Twenty-four grams corresponding to 63.02 percent of the theoretical yield are obtained. Its melting point is 90°-92° C.

Twenty-one grams of said compound are heated to boiling in 40 cc. of ethanol. Forty-six cubic centimeters of 15 percent sodium hydroxide solution are added thereto and the mixture is boiled under reflux for 1 hour while stirring. Thereafter 25 cc. to 30 cc. of ethanol are distilled off in a low vacuum at 50° C. The precipitated hydrazo benzene is removed by filtration from the reaction mixture which is then shaken twice, each time with 50 cc. of benzene. Thirty-three cubic centimeters of 15 percent hydrochloric acid are added to the aqueous-alkaline solution, which is then extracted twice, each time with 30 cc. of benzene. The benzene extracts are combined, washed with water, dried over magnesium sulfate, and the solvent is distilled off in a vacuum. Fifteen grams of a yellowish, highly viscous oil remain as residue. Said oil is dissolved in a small amount of benzene and excess petroleum ether is added to the solution. The residue is filtered off by suction and dried. The yield is 7.6 g. corresponding to 58.2 percent of the theoretical yield. The melting point is 75° C. (with decomposition). The total yield calculated for n-butyl malonic acid ethyl ester chloride is 36.67 percent of the theoretical yield.

EXAMPLE 3

α-Carboxy caproyl-N,N'-diphenyl hydrazide

A solution of 68 g. of n-butyl malonic acid ethyl ester monochloride in 50 g. of benzene is added drop by drop to a suspension of 56.5 g. of N-acetyl hydrazobenzene and 38.4 g. of triethylamine in 500 g. of benzene at 20°–30° C. within 1 hour while stirring. Stirring is then continued for 1 hour. The precipitated triethylamine hydrochloride is filtered off by suction. The filtrate is first shaken with 2N hydrochloric acid, thereafter repeatedly with N sodium hydroxide solution and water. The solvent is distilled off. Ninety grams to 95 g. of crude N-acetyl-N'-(α-carbethoxy caproyl) hydrazobenzene of the melting point 58°–63° C. are obtained. After recrystallization from petroleum ether, 85 g. of the pure compound melting at 65–66° C. are recovered. The yield is 86 percent of the theoretical yield.

Twenty parts of the resulting N-acetyl-N'-(α-carboethoxy caproyl) hydrazobenzene are heated on the boiling water bath in a mixture of 220 g. N sodium hydroxide solution and 160 g. of ethanol for 1 hour. Thereafter, the ethanol is distilled off in a vacuum. 250 g. of water are added, the mixture is cooled to 10° C., the precipitated hydrazobenzene is filtered off, the filtrate is acidified by the addition of dilute hydrochloric acid, and the precipitated oil is dissolved in benzene. After the addition of petroleum ether, 14.1 g. of N-(α-carboxy-caproyl)-N,N'-diphenyl hydrazine of the melting point 77°–78° C. are obtained. The yield is 85 percent of the theoretical yield.

The same product is obtained in a similar yield and of the same degree of purity by saponifying N-acetyl-N,N'-(α-carbethoxy caproyl) hydrazobenzene in the absence of ethanol or by using the same amount of dioxane, in place of ethanol, as a dissolving aid.

EXAMPLE 4

α-Carboxy caproyl-N,N'-diphenyl hydrazide

A solution of 8.3 g. of n-butyl malonic acid ethyl ester chloride in 30 g. of benzene is added drop by drop at 20°–30° C. to a solution of 11.3 g. of N-caproyl hydrazobenzene and 4.6 g. of triethylamine in 90 g. of absolute chloroform at 20°–30 C. within 30 minutes while stirring. Stirring of the mixture is continued for 2 more hours. The precipitated triethylamine hydrochloride is filtered off by suction. The filtrate is first shaken with 2N hydrochloric acid, thereafter repeatedly with N sodium hydroxide solution and water, and the solvent is distilled off. 15.2 g. of N-caproyl-N'-(α-carbethoxy caproyl) hydrazobenzene are obtained. The yield is 84 percent of the theoretical yield. After recrystallization from petroleum ether, the product melts at 52°–53° C.

Twenty grams of N-caproyl-N'-(α-carbethoxy caproyl) hydrazobenzene are heated on a boiling water bath in a mixture of 200 g. of N sodium hydroxide solution and 185 g. of dioxane for 1 hour. Thereafter, ethanol is distilled off in a vacuum. The reaction mixture is worked up as described in example 3. 10.7 g. of N-(α-carboxy caproyl)-N,N'-diphenyl hydrazide melting at 78°–82° C. are obtained. The yield is 81 percent of the theoretical yield.

EXAMPLE 5

α-Carboxy caproyl-N,N'-diphenyl hydrazide

One thousand grams of n-butyl malonic acid, 970 g. of thionylchloride are heated in 880 g. of dry benzene at 50° C. for 20 hours in a 4 liter flask provided with a vacuumtight stirring attachment and a reflux condenser with a calcium chloride tube. Thereafter the benzene and excess thionylchloride are distilled off in a vacuum while stirring. The remaining light yellow oil is dissolved in 2,600 g. of toluene and the resulting solution of n-butyl malonic acid mono- or, respectively, dichloride is placed into a pear-shaped 20 liter container which is provided with a discharge valve at the bottom and a stainless steel stirrer and which can be heated by means of a mushroom-shaped heating cover. A suspension of 1,000 g. of N-acetyl hydrazobenzene and 540 g. of N,N'-dimethylanilin in 2,600 g. of dry toluene prepared by stirring in a 10 liter feed vessel is then added to said solution within 1 hour while continuously stirring. The temperature increases to about 45° C. After the addition is completed, a clear solution is obtained. The reaction mixture is heated slowly to 70° C. within 3 hours. Three thousand grams of 2N hydrochloric acid are added thereto, the reaction mixture is stirred for 10 minutes, the aqueous layer is separated, and the organic layer is again washed with 1,500 g. of hot water. After separating the aqueous layer, the N-acetyl-N'-(α-carboxy caproyl) hydrazobenzene crystallizes. The precipitate is filtered off by suction at 10°–15° C., is suspended in 4,000 g. of hot water, freed of adhering solvent by blowing steam therethrough, and the residue is dried, after filtration by suction, in a vacuum drier at 100° C. 980 g. of N-acetyl-N'-(α-carboxy caproyl) hydrazobenzene of the melting point of 158°–160° C. are obtained. The yield is 60 percent of the theoretical yield. The compound, after recrystallization from acetone, melts at 161°–163°C.

Five hundred grams of the resulting N-acetyl-N'-(α-carboxy caproyl) hydrazobenzene are added to 5,700 g. of N sodium hydroxide solution heated to about 90°–95 C. and the mixture is stirred at said temperature for 45 minutes. The solution is cooled to 20° C. The crystallizing hydrazobenzene is filtered off. The filtrate is adjusted to a pH of 8.0 by the addition of 2N hydrochloric acid. The solution is heated to 40° C., 10 g. of activated charcoal and 5 g. of tonsil are added thereto, the mixture is stirred at said temperature of 40° C. for 10 minutes, filtered off by suction, and acidified to a pH of 3.0 by the addition of 2N hydrochloric acid. The precipitated oil is dissolved in 1,740 g. of benzene and 990 g. of petroleum ether are added. 355 g. of N-(α-carboxy caproyl)-N,N'-diphenyl hydrazide of the boiling point 77°–79° C. are obtained. The yield is 80 percent of the theoretical yield.

EXAMPLE 6

α-Carboxy capryl-N,N'-diphenyl hydrazide

A solution of 15.2 g. of n-hexyl malonic acid and 10.1 g. of thionylchloride in 36 g. of ether is heated under reflux for 6 hours. Thereafter, the solvent is distilled off in a vacuum at 20°–30 C. and the residue is dissolved in 40 g. of benzene. A solution of 14.7 g. of hydrazobenzene and 12.6 g. of dimethylaniline in 80 g. of benzene is added drop by drop to said benzene solution at 5°–10° C. within 30 minutes while stirring. Stirring of the mixture is continued at 20°–25° C. for 2 hours. The precipitated dimethylaniline hydrochloride is filtered off by suction. The benzene solution is shaken with 30 g. of 2N hydrochloric acid and 30 g. of water and subsequently with 50 g. of 3N sodium hydroxide solution. The aqueous-alkaline solution is separated, diluted with 50 g. of water, and acidified by the addition of 6N hydrochloric acid. The precipitated oil is extracted with chloroform. The chloroform solution is dried over magnesium sulfate and the solvent is distilled off in a vacuum. 13.3 g. of N-(α-carboxy capryl)-N,N'-diphenyl hydrazide are obtained in the form of a slightly yellowish oil which slowly crystallizes. The compound has a melting point of 115° C. on recrystallization from a mixture of benzene and petroleum ether (2:1).

When using, in place of n-hexyl malonic acid, other substituted malonic acids and proceeding as described in the preceding examples, the following N-(α-carboxy alkanoyl)-N,N'-diphenyl hydrazides of the formula V are obtained:

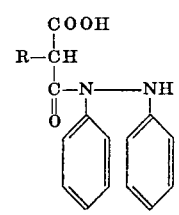

V

The yield is about the same.

TABLE I

| Example | substituent R | Melting points Lower melting form, °C. | Melting points Higher melting form, °C. |
|---|---|---|---|
| 7 | $CH_3-CH_2-CH_2-$ | [1] 77–79 | [2] 125–127 |
| 8 | $CH_3-CH_2-CH_2-CH_2-$ | [1] 77–79 | [3] 115–117 |
| 9 | $\begin{array}{c}CH_3\\ \phantom{CH}\diagdown\\ CH-CH_2-\\ \phantom{CH}\diagup\\ CH_3\end{array}$ | 75–78 | |
| 10 | $CH_3-CH_2-CH_2-CH_2-CH_2-$ | 71–74 | [2] 106–108 |
| 11 | $\begin{array}{c}CH_3\\ \phantom{CH}\diagdown\\ CH-CH_2-CH_2-\\ \phantom{CH}\diagup\\ CH_3\end{array}$ | 74–77 | |
| 12 | $CH_3-CH_2-CH_2-CH_2-CH_2-CH_2-$ | 113–115 | [2] 123–124 |

[1] Benzene/petroleum ether.
[2] Ether/petroleum ether.
[3] Benzene.

As is evident from the table, some of the resulting compounds exist in a lower and a higher melting modification. The lower melting modification is obtained by causing the compound to rapidly crystallize while the higher melting crystal form results on carrying out the crystallization very slowly. Both modifications can be converted into each other. Each of said modification as such is a chromatographically pure compound.

EXAMPLE 13

α-Carboxy caproyl-N,N'-diphenylhydrazide

A solution of 17.9 g. of n-butyl malonic acid ethyl ester monochloride in 20 g. of benzene is added drop by drop at 20°–30 C. to a solution of 18 g. of N-benzoyl hydrazobenzene and 8.8 g. of triethylamine in 160 g. of benzene within 30 minutes. Stirring of the reaction mixture is continued for 2 more hours. The precipitated triethylamine hydrochloride is filtered off by suction. The filtrate is first shaken with 2N hydrochloric acid and thereafter repeatedly with N sodium hydroxide solution and with water and the solvent is distilled off in a vacuum. 26.6 g. of N-benzoyl-N'-(α-carbethoxy caproyl)-N,N'-diphenyl hydrazide are obtained in the form of a highly viscous oil. The yield is 92 percent of the theoretical yield. Said oil crystallizes on triturating with 65 g. of cyclohexane. It has a melting point of 97° C. After recrystallization from cyclohexane, it melts at 103° C.

Twenty grams of N-benzoyl-N'-(α-carbethoxy caproyl)-N,N'-diphenyl hydrazide are heated in a mixture of 175 g. of N sodium hydroxide solution and 140 g. of ethanol on the boiling water bath for 1½ hours. Thereafter, the ethanol is distilled off in a vacuum. 250 g. of water are added to the mixture, which is then cooled to 10° C. Precipitated hydrazobenzene is filtered off, the filtrate is acidified by the addition of dilute hydrochloric acid, and the precipitated oil is dissolved in benzene. After adding petroleum ether thereto and filtering off the precipitate by suction, 11.6 g. of N-(α-carboxy caproyl)-N,N'-diphenyl hydrazide of a melting point of 76°–78 C. are obtained. The yield is 84 percent of the theoretical yield.

EXAMPLE 14

α-Carboxy caproyl-N,N'-diphenyl hydrazide

Twenty grams of N-carbobenzoxy-N'-(α-carbethoxy caproyl)-N,N'-diphenyl hydrazide of the melting point 61°–63° C. which was prepared according to example 1 by condensing N-carbobenzoxy hydrazobenzene and n-butyl malonic acid ethyl ester monochloride, are heated in a mixture of 175 g. of N sodium hydroxide solution and 140 g. of ethanol on the boiling water bath for 6 hours. Thereafter, the reaction mixture is worked up as described in example 13. 10.2 g. of N-(α-carboxy caproyl)-N,N'-diphenyl hydrazide of the melting point 75 –78° C. are obtained. The yield is 81 percent of the theoretical yield.

EXAMPLE 15

α-Carboxy caproyl-N,N'-diphenyl hydrazide 41.5 g. of n-butyl malonic acid are heated to 50° C. with 45.5 g. of thionylchloride and 36 g. of benzene for 20 hours. Excess thionylchloride is distilled off in a vacuum by stirring. The remaining light yellow oil is dissolved in 106 g. of dry benzene. A stirred suspension of 54 g. of benzoyl hydrazobenzene and 22.7 g. of dimethylaniline in 106 g. of benzene is added drop by drop to said solution within about 30 minutes. Stirring of the mixture is continued for 1 more hour. The resulting mixture is extracted twice with 2N hydrochloric acid, each time with 100 g. thereof, the aqueous layer is separated, and the benzene layer is evaporated to dryness. Seventy-six grams of a highly viscous oil of N-benzoyl-N'-(α-carboxy caproyl)-hydrazobenzene are obtained. It crystallizes only very slowly. The yield is about 93 percent of the theoretical yield.

Fifty grams of the resulting red N-benzoyl-N'-(α-carboxy caproyl) hydrazobenzene are heated under reflux with 485 g. of N sodium hydroxide solution for 1½ hours while stirring. After cooling, precipitated hydrazobenzene is filtered off, the aqueous layer is acidified, the precipitated oil is dissolved in 130 g. of benzene, and 100 g. of petroleum ether of the boiling point 40°–70° C. are added to said benzene solution. Twenty-one grams of N-(α-carboxy caproyl)-N,N'-diphenyl hydrazide of the melting point 77°–79° C. are obtained. The yield is 52 percent of the theoretical yield.

EXAMPLE 16

Sodium salt of α-carboxy caproyl-N,N'-diphenyl hydrazide

One hundred grams of N-acetyl-N'-(α-carboxy caproyl) hydrazobenzene prepared according to example 5 are added, while stirring, to 1,100 cc. of N sodium hydroxide solution heated to 95° C. After continuing stirring of the reaction mixture at said temperature for 40 more minutes, it is cooled to about 10° C. by immersing into an ice bath. 370 cc. of a saturated aqueous sodium chloride solution are added thereto. The mixture is stirred at a temperature of 5°–10° C. for 1½ hours and the precipitated sodium salt is filtered off by suction. The salt is washed on the suction filter with 50 cc. of saturated sodium chloride solution and is then dissolved in 250 cc. of water at a temperature of 30°–35° C. The solution is filtered and carbon dioxide is passed into the filtrate until a pH value of 7.0 is attained. The solution which has a temperature of about 30° C. is then extracted three times with ligroin, each time with 100 cc. thereof. Benzene is added to the extracted aqueous solution in an amount equal to its volume. The mixture is then shaken whereby three layers are formed. The middle layer is separated and an equal volume of water is added thereto whereby a reddish benzene layer is formed which is discarded. One hundred cubic centimeters of a saturated sodium chloride solution are added to the almost colorless aqueous layer. Three hundred cubic centimeters of benzene are carefully poured on top of said aqueous layer without mixing. Thereafter, the two layers are shaken whereby three layers are formed. The upper and the middle layer are combined and evaporated to dryness. The lower aqueous layer is discarded. After evaporating said benzene layers to dryness, the sodium salt of α-carboxy caproyl-N,N'-diphenyl hydrazide is obtained in a yield of 76– 78 g. corresponding to 80–82 percent of the theoretical yield.

As stated above, the preferred process according to the present invention consists in condensing a malonic acid compound of formula III

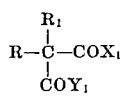

wherein
R is a member selected from the group consisting of hydrogen alkyl with one to 10 carbon atoms; alkenyl with one to 10 carbon atoms; cycloalkyl; cycloalkenyl; alkyl, the carbon chain of which is interrupted by a member selected from the group consisting of oxygen, sulfur, and nitrogen; alkenyl, the carbon chain of which is interrupted by a member selected from the group consisting of oxygen, sulfur, and nitrogen; cycloalkyl having a member selected from the group consisting of oxygen, sulfur, and nitrogen, cycloalkyl having a member selected from the group consisting of oxygen, sulfur, and nitrogen between two carbon atoms of its cycloalkyl ring; cycloalkenyl having a member selected from the group consisting of oxygen, sulfur, and nitrogen between two carbon atoms of its cycloalkenyl ring; aryl; aralkyl; aryl substituted by a member selected from the group consisting of halogen, hydroxyl, lower alkoxy, nitro, amino, di-lower alkylamino, and lower alkyl; and aralkyl substituted by a member selected from the group consisting of halogen, hydroxyl, lower alkoxy, nitro, amino, di-lower alkylamino, and lower alkyl;

$R_1$ is a member selected from the group consisting of alkyl with one to 10 carbon atoms; alkenyl with one to 10 carbon atoms; cycloalkyl, cycloalkenyl; alkyl, the carbon chain of which is interrupted by a member selected from the group consisting of oxygen, sulfur, and nitrogen; alkenyl, the carbon chain of which is interrupted by a member selected from the group consisting of oxygen, sulfur, and nitrogen; cycloalkyl having a member selected from the group consisting of oxygen, sulfur, and nitrogen between two carbon atoms of its cycloalkyl ring; cycloalkenyl having a member selected from the group consisting of oxygen, sulfur, and nitrogen between two carbon atoms of its cycloalkenyl ring; aryl; aralkyl; aryl substituted by a member selected from the group consisting of halogen, hydroxyl; lower alkoxy, nitro, amino, di-lower alkylamino, and lower alkyl; and aralkyl substituted by a member selected from the group consisting of halogen, hydroxyl, lower alkoxy, nitro, amino, di-lower alkylamino, and lower alkyl;

$X_1$ is halogen; and
$Y_1$ is a member selected from the group consisting of hydroxyl, lower alkoxy, and benzyloxy; with a hydrazine compound of the formula

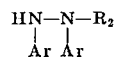

wherein
Ar is a member selected from the group consisting of phenyl, phenyl substituted by halogen, phenyl substituted by alkyl, and phenyl substituted by alkoxy, preferably lower alkoxy, and
$R_2$ is a member selected from the group consisting of hydrogen, alkanoyl with one to six carbon atoms, alkenoyl with one to five carbon atoms, benzoyl, and α-carbalkoxy alkanoyl;
in an inert organic solvent at a temperature not substantially exceeding 90° C. The resulting condensation product is then subjected to saponification whereby not only the acyl group $R_2$ is saponified but also the ester group $COY_1$. It is highly surprising that, when saponifying the ester group $COY_1$, the acyl group $R_2$ is also split off without the other acyl group being affected and without causing ring closure to the corresponding 3,5-dioxo pyrazolidine compound. When $R_2$ is chloro acetyl or dichloro acetyl, such ring closure takes place on saponification. This specific process is of considerable value because it permits the production of substituted malonic acid hydrazine compounds of formula I

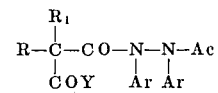

in a substantially higher yield than according to the other methods of production described hereinabove.

Furthermore, said process permits the production of new intermediate compounds of formula I which can readily be converted into 3,5-dioxo pyrazolidines but which are also valuable growth regulators for plants and weed killing agents as has been pointed out hereinabove.

It is understood, of course, that, in place of the reactants used in the preceding examples, there may be employed other reactants. For instance, in place of the alkyl malonic acid compounds used in the examples, there may be employed compounds in which R and $R_1$ are such alkyl or other substituents. Suitable compounds of this type are, for instance, diethyl malonic acid, ethyl isopropyl malonic acid, ethyl n-butyl malonic acid, ethyl phenyl malonic acid, ethyl iso-amyl malonic acid, ethyl pentyl malonic acid, and other di-substituted malonic acids and their monohalogenides or ester halogenides.

Furthermore compounds wherein $R_1$ indicates an alkenyl group while R may be hydrogen or another substituent may also be used as starting materials such as, for instance, allyl malonic acid, allyl isopropyl malonic acid, diallyl malonic acid, allyl isobutyl malonic acid, allyl pentyl malonic acid, and other alkenyl substituted malonic acids and their monohalogenides or ester halogenides.

Another group of compounds which have proved to be useful in the preparation of hydrazides according to the present invention are cycloalkyl- and cycloalkenyl-substituted malonic acids, such as cyclopentyl malonic acid, cyclohexyl malonic acid, methyl cyclohexyl malonic acid, cyclohexenyl malonic acid, cyclopentenyl malonic acid, ethyl cyclopentenyl malonic acid, and other malonic acids substituted by cycloalkyl or cycloalkenyl substituents.

The substituent $R_1$ may not only be phenyl, benzyl, or phenethyl, but also, and preferably, tolyl, naphthyl, chloro phenyl, bromo phenyl, hydroxy phenyl, hydroxy tolyl, nitro phenyl, amino phenyl, dialkylamino phenyl, alkoxy phenyl, and the corresponding substituted tolyl, naphthyl, benzyl, phenethyl, or the like substituted malonic acids compounds.

Furthermore the carbon chain or ring of the alkyl, alkenyl, cycloalkyl, or cycloalkenyl substituents R and/or $R_1$ may be interrupted by oxygen, sulfur, or the imino group. For instance, methyl thioethyl malonic acid, propyloxy methyl malonic acid, methyl thioethylpentyl malonic acid, isopropyl furfuryl malonic acid, and the like compounds may be used as starting materials in the process of this invention.

In place of hydrazobenzene used as the other reactant in the preceding examples, there may be employed hydrazobenzenes which are substituted in their aryl moieties by halogen, alkyl or alkoxy. Such compounds are, for instance, di (p-chlorophenyl) hydrazine, di-(alkoxy phenyl) hydrazine, di-(dibromo phenyl) hydrazine, di-(o-methyl phenyl) hydrazine and others. Said hydrazines may be acylated at their nitrogen atoms as indicated hereinabove.

As stated hereinabove, the new compounds of formula II as well as other compounds according to this invention possess a low toxicity and a high antiphlogistic, antipyretic, and analgesic activity. Pharmacological tests are given in the following tables whereby the toxicity and therapeutic activity of said compounds are compared with those of the well known 1,2- diphenyl-3,5-dioxo pyrazolidines. Table II gives a comparison of the toxicity, anti-inflammatory analgesic, and temperature reducing activity of 1,2-diphenyl-3,5-dioxo pyrazolidines with those of the corresponding N,N'-diphenyl malonic acid hydrazides according to this invention. The pyrazolidine compounds are designated by P, while the hydrazide compounds are designated by MH. The toxicity of 1,2-diphenyl-3,5-dioxo pyrazolidine, i.e. phenylbutazone is given as 100, while the analgesic and antipyretic activity is compared with that of amino phenazone which is also given as 100.

TABLE II

| Substituent R | Compound | Toxicity (mice)[1] | Anti-inflammatory activity (rat)[2] | Analgesic activity (mouse)[3] | Antipyretic activity (rat)[4] |
|---|---|---|---|---|---|
| n-Propyl | P | 261 | 72 | 36 | 20 |
|  | MH | 580 | 72 | 60 | 31 |
| n-Butyl | P | 100 | 100 | 64 | 38 |
|  | MH | 292 | 132 | 44 | 56 |
| n-Amyl | P | 69 | 82 | 37 | — |
|  | MH | 222 | 82 | 97 | 75 |
| n-Hexyl | P | 91 | 93 | 46 | 53 |
|  | MH | 161 | 48 | 85 | 61 |
| iso-Butyl | P | 196 | 57 | 68 | 20 |
|  | MH | 346 | 78 | 42 | 45 |
| iso-Amyl | P | 81 | 110 | 96 | 28 |
|  | MH | 200 | 104 | 64 | 82 |

[1] $LD_{50}$ intravenously, phenylbutazone=100.
[2] 50 mg./kg., phenylbutazone orally=100.
[3] 100 mg./kg., aminophenazone orally=100.
[4] 50 mg./kg., aminophenazone intraperitoneally=100.

Table III compares the mean lethal dose after intravenous administration to mice and the behavior of mice after intravenous administration of sublethal doses of 1,2-diphenyl-3,5-dioxo pyrazolidines with those of the corresponding N,N'-diphenyl malonic acid hydrazides according to this invention. ($LD_{50}$ is calculated according to the method of Kaerber.)

TABLE III

| Substituent R | Compound | Number of mice tested | $LD_{50}$ (mg./kg.) | Effect |
|---|---|---|---|---|
| n-Propyl | P | 25 | 287 | Ataxy, respiration accelerated. |
|  | MH | 25 | 638 | Excitation after injection, thereafter sedation. |
| n-Butyl | P | 30 | 110 | Ataxy, increased tone of the muscle, in some animals convulsions. |
|  | MH | 25 | 320 | In some animals loss of postural reflexes, increased tone of the muscle. |
| n-Amyl | P | 20 | 76 | Slightly excited for 15 minutes. |
|  | MH | 20 | 245 | Slightly sedated. |
| n-Hexyl | P | 25 | 101 | Loss of equilibrium, sedated. |
|  | MH | 30 | 177 | Slightly excited. |
| —Isobutyl | P | 20 | 215 | Ataxy, convulsions. |
|  | MH | 30 | 380 | Sedated, in some animals loss of beards hair reflex. |
| —Isoamyl | P | 25 | 89 | Loss of postural reflexes, convulsions. |
|  | MH | 30 | 220 | Normal, two animals showed bloody urine, some animals necrotic tails. |

It is evident from this table that the toxicity of the claimed compounds is at least twice as low as that of the corresponding 3,5-dioxo-1,2-diphenyl pyrazolidines. The compounds of tables II and III have an antiphlogistic activity which is about the same as that of phenylbutazone as is evident when determining the inhibition or suppression of edema caused by carrageenin injection into the hind paw of rats whereby the percentage of such inhibition is determined 120 minutes and 240 minutes after administration of 50 mg./kg. of the respective compound given perorally.

The analgesic activity of the new compounds is determined by measuring the extension in reaction time on thermal irritation of the mouse tail by means of a focused spot of light. The effect of 100 mg./kg. of the tested malonic acid hydrazides according to the present invention and of the corresponding pyrazolidine compounds is compared in the following table IV with that of 100 mg./kg. of aminophenazone, given perorally.

TABLE IV

| Substituent R | Compound | No. of animals | Extension of reaction time in seconds by 100 mg./kg. given after minutes | | | | Σ30–90/4 | Relative activity compared with aminophenazone =100 |
|---|---|---|---|---|---|---|---|---|
| | | | 30 | 60 | 90 | 120 | | |
| n-propyl | P | 12 | 13 | 8 | 5 | 0 | 6,5 | |
|  | MH | 12 | 23 | 15 | 9 | 8 | 13,7 | |
| n-butyl | P | 12 | 16 | 20 | 10 | 7 | 13,2 | |
|  | MH | 12 | 9 | 12 | 11 | 4 | 9 | |
| n-amyl | P | 12 | 11 | 7 | 7 | 3 | 7 | |
|  | MH | 12 | 19 | 19 | 20 | 15 | 18,2 | |
| n-hexyl | P | 12 | 16 | 11 | 6 | 8 | 10,2 | |
|  | MH | 18 | 26 | 25 | 23 | 15 | 22,2 | |
| -isobutyl | P | 12 | 23 | 28 | 18 | 9 | 19,5 | |
|  | MH | 12 | 15 | 8 | 10 | 11 | 11 | |
| -isoamyl | P | 12 | 30 | 37 | 26 | 17 | 27,5 | |
|  | MH | 18 | 19 | 12 | 15 | 11 | 14,2 | |
| n-propyl | P | 12 | 31 | 23 | 24 | 5 | 18 | 36,2 |
|  | MH | 12 | 29 | 26 | 21 | 16 | 23 | 59,8 |
| n-butyl | P | 12 | 28 | 32 | 14 | 9 | 20,7 | 64 |
|  | MH | 12 | 32 | 30 | 12 | 8 | 20,5 | 44 |
| n-amyl | P | 12 | 31 | 23 | 16 | 5 | 18,7 | 37,4 |
|  | MH | 12 | 26 | 24 | 13 | 12 | 18,7 | 97,4 |
| n-hexyl | P | 12 | 34 | 28 | 16 | 10 | 22 | 46,5 |
|  | MH | 18 | 28 | 32 | 24 | 20 | 26 | 85,5 |
| -isobutyl | P | 12 | 28 | 44 | 27 | 16 | 28,7 | 68 |
|  | MH | 12 | 32 | 32 | 24 | 16 | 26 | 42,5 |
| -isoamyl | P | 12 | 28 | 44 | 27 | 16 | 28,7 | 96 |
|  | MH | 18 | 32 | 29 | 14 | 14 | 22,2 | 64 |

It is evident that the n-propyl, the n-amyl, and the n-hexyl compounds according to the present invention are highly effective. When taking into consideration the low toxicity of the isoamyl compound, this compound is also considerably more effective than aminophenazone.

Preferably the compounds of the present invention as described hereinabove are administered orally in a pharmaceutical carrier, for instance, in the form of tablets, pills, lozenges, dragees, and the like shaped and/or compressed preparations. It is also possible to produce emulsions or suspensions of said compounds in water or aqueous media such as unsweetened fruit juice and by means of suitable emulsifying or dispersing agents. The new compounds may furthermore be employed in the form of powders filled into gelatin capsules or the like.

Such powders and mixtures to be used in the preparation of tablets and other shaped and/or compressed preparations may be diluted by mixing and milling with a solid pulverulent extending agent to the desired degree of fineness or by impregnating the already milled, finely powdered, solid carrier with a suspension of said compounds in water or with a solution thereof in an organic solvent and then removing the water or solvent.

When preparing tablets, pills, dragees, and the like shaped and/or compressed preparations, the commonly used diluting, binding and disintegrating agents, lubricants, and other tableting adjuvants are employed, provided they are compatible with said malonic acid hydrazides. Such diluting agents and other excipients are, for instance, sugar, lactose, levulose, starch, bolus alba; as disintegrating and binding agents, gelatin, gum arabic, yeast extract, agar, tragacanth, methyl cellulose, pectin; and, as lubricants, stearic acid, talc, magnesium stearate, and others.

It is, of course, also possible to administer the new malonic acid hydrazides in the form of suppositories whereby the commonly used suppository vehicles such as cocoa butter are used.

The amounts of said malonic acid hydrazide compounds according to the present invention in pharmaceutical compositions may be varied. It is also possible to administer several dosage unit forms at the same time. Preferred preparations contain between about 50 mg. and 200 mg. of the malonic acid hydrazide compound.

When administering such tablets in gout, rheumatoid arthritis, rheumatoid spondylitis, bursitis, acute arthritis of that joint, and other painful joint diseases, the initial dosage may be between 300 mg. and 600 mg. daily divided into three or four equal doses taken with the food. The maintenance dose may range between 100 mg. and 400 mg. daily. Due to the low toxicity of the malonic acid hydrazides according to the present invention the danger of serious side effects is considerably reduced.

As stated hereinabove, the compounds according to formulas I and II have proved to be highly effective plant growth regulating agents and weed killers or herbicides. Such acids may be sprayed in the form of their sodium salt solutions over the area to be treated therewith. A suitable solution comprises, for instance, 1 kg. of N-acetyl-N'-(α-carboxy caproyl)-N,N'-diphenyl hydrazide,
0.6 kg. of sodium carbonate,
16.1. l. of water.

This solution is preferably emulsified with 4 l. of diesel oil.

The diesel oil reduces the volume of water required, keeps the spray from evaporating and landing as a dust, and aids in distributing the effective compound over the leaves of plants to be treated therewith. The above-given amount is usually sufficient to treat one acre of land. Of course, other compounds according to this formula may also be used.

The alkali metal salts and especially the sodium salts have proved to be of considerable value as dissolving aids for compounds which are difficulty soluble in water, as has been pointed out hereinabove. These salts have the further surprising property that they are lipophilic and are soluble, for instance, in benzene. For instance, the solubility of the sodium salt of α-carboxy caproyl-N,N'-diphenyl hydrazide amounts to 13 g. in 10 cc. of benzene at 25° C. In contrast thereto, the free acid has a solubility of only 2.1 g. in 100 cc. of benzene at 20° C. The alkali metal salts and especially the sodium salts of the malonic acid hydrazides according to the present invention are distinguished over the free acids by their high stability. The free acids are rather rapidly converted on standing and especially at elevated temperatures into the corresponding 1,2-diphenyl-3,5-dioxo pyrazolidines by ring closure. Such ring closure takes place especially readily if the free acid is contaminated by small amounts of the corresponding pyrazolidine compound. When purifying for instance, α-carboxy caproyl-N,N'-diphenyl hydrazide by converting it into the sodium salt and extracting the sodium salt in benzene, a compound is obtained which is free of even traces of the pyrazolidine compound. The following tables illustrate quantitatively the conversion of α-carboxy caproyl-N,N'-diphenyl hydrazide which is contaminated by phenyl butazone into the latter compound. For this purpose α-carboxy caproyl-N,N'-diphenyl hydrazide which contains 0.6 percent of phenylbutazone is kept in a closed drying oven at 47° C. The following amounts of phenylbutazone were found in the hydrazide after the storage period given.

TABLE V

| Storage period | Content of phenylbutazone |
|---|---|
| 1 day | 2.2% |
| 2 days | 4.4% |
| 3 days | 9.2% |
| 4 days | 24.5% |
| 9 days | 79.0% |

The following table VI illustrates the effect of only 0.1 percent of phenylbutazone on the same compound when kept under the same conditions in a drying oven at 47° C.

TABLE VI

| Storage period | Phenylbutazone |
|---|---|
| 1 day | 0.2% |
| 2 days | 0.4% |
| 4 days | 0.8% |
| 7 days | 3.0% |
| 8 days | 6.7% |
| 9 days | 15.5% |
| 11 days | 31.0% |

It is evident that the speed of conversion is depending upon the amount of phenylbutazone present in the malonic acid hydrazide and thus is subjected to autocatalysis.

In contrast thereto, the sodium salt as obtained, for instance, according to example 16 does not undergo any change even if phenylbutazone is present.

Of course, many changes and variations in the starting materials used, in the reaction conditions, temperature, duration, in the methods of working up the reaction products and of isolating and purifying the same, in the manner of preparing compositions therewith and of using them, and the like may be made by those skilled in the art in accordance with the principles set forth herein and in the claims annexed hereto.

EXAMPLE 17

Solubilizing effect of the sodium salt of α-carboxy caproyl-N,N'-diphenylhydrazide on p-chloro-m-cresol A solution of 2.7 g. of p-chloro-m-cresol in 40 cc. of methanol is added drop by drop to 60 cc. of a 10 percent aqueous solution of the sodium salt of α-carboxy caproyl-N,N'-diphenylhydrazide within 10 minutes while stirring. A clear solution of about neutral reaction is obtained. It contains 2.7 percent of p-chloro-m-cresol, the normal solubility in water of which is 0.4 percent. The resulting solution possesses the full antibacterial activity of p-chloro-m-cresol.

EXAMPLE 18

Solubilizing effect of the sodium salt of α-carboxy caproyl-N,N'-diphenylhydrazide on hexachlorophene The procedure of example 17 is repeated by using a solution of 1.15 g. of hexachlorophene in 40 cc. of methanol in place of the methanolic solution of p-chloro-m-cresol.

Thereby a clear solution of a pH-value of 7.0 which possesses the full antibacterial activity of hexachlorophene is obtained.

On carrying out the procedure in the absence of the above-mentioned sodium salt, an aqueous solution of hexachlorophene cannot be obtained.

EXAMPLE 19

N-Chloroacetyl-N'-(α-carbethoxy caproyl) hydrazobenzene

A solution of 13.3 g. of n-butyl malonic acid ethylester monochloride in 25 cc. of benzene is added to a well-agitated suspension of 13 g. of chloroacetyl hydrazobenzene in 250 cc. of chloroform containing 5.2 g. of triethylamine, while the temperature of the reaction mixture is kept at 0° C. Stirring is continued for 2 more hours. The precipitated triethylamine hydrochloride is filtered off, the filtrate is extracted with 20 cc. of 2N hydrochloric acid followed by extraction with 20 cc. of N sodium hydroxide solution and then twice with each 50 cc. of water. The benzene layer is separated and dried over magnesium sulfate and the solvent is distilled off. The residue is recrystallized from cyclohexane and yields 22.5 g. of N-chloroacetyl-N'-(α-carbethoxy caproyl) hydrazobenzene having a melting point of 96°–97° C. The yield obtained corresponds to 84 percent of the theoretical yield.

EXAMPLE 20

N-Dichloroacetyl-N'-(α-carbethoxy caproyl) hydrazobenzene a. N-Dichloroacetyl hydrazobenzene is prepared by reaction of equimolecular amounts of hydrazobenzene with dichloroacetylchloride in absolute chloroform containing an equimolecular amount of triethylamine, at 0° C. during 2 hours. After extracting the chloroform layer with 2N hydrochloric acid followed by extraction with N sodium hydroxide solution and then with water, drying over sodium sulfate and evaporating to dryness, the N-dichloro acetyl hydrazobenzene is obtained in a yield of 81 percent. The compound has the melting point 137°–138° C.

b. Following the procedure as described in example 19, 13.3 g. of n-butyl malonic acid ethylester monochloride are reacted with 14.8 g. of dichloro acetyl hydrazobenzene in 200 cc. of dry chloroform containing 5.2 g. of triethylamine.

Thereby, 16 g. of N-dichloro acetyl-N'-(α-carbethoxy caproyl) hydrazobenzene which has a melting point of 83°–84° C. after recrystallization from cyclohexane, are obtained.

EXAMPLE 21

1,2,4-Triphenyl-1-(α-carbethoxy caproyl) semicarbazide

In a solution of 14 g. of triethylamine in 300 g. of benzene there are suspended 30.3 g. of 1,2,4-triphenyl semicarbazide. 26.8 g. of n-butyl malonic acid ethylester monochloride dissolved in 30 cc. of benzene at 20° C. are added drop by drop to said well-stirred suspension within 1 hour. Thereafter, the reaction mixture is boiled under reflux for 30 more minutes, cooled and washed with 100 cc. of water, followed by extraction with 50 cc. of 2N hydrochloric acid and then with 50 cc. of a 2 percent sodium bicarbonate solution until neutral. The benzene layer is dried over magnesium sulfate and distilled to dryness. The residue is triturated with 50 cc. of petroleum ether and the crystals are filtered off by suction. 26.5 g. of 1,2,4-triphenyl-1-(α-carbethoxy caproyl) semicarbazide are recovered corresponding to a yield of 56 percent. The product melts at 77°–79° C.

In addition to the statements made on page 36, lines 6 to 16 it may be pointed out that the known sodium salt of phenylbutazone is insoluble in benzene. The relative high solubility of the closely related sodium salt of α-carboxy caproyl-N,N'-diphenylhydrazide of the present invention, therefore, proves to be a highly surprising fact which may afford a proper basis for an explanation of the distribution data between lipophilic/hydrophilic systems and may possibly open interesting aspects for explaining the mechanism of the pharmacological and therapeutic activity of said sodium salt.

We claim:

1. The malonic acid hydrazide compound of the formula

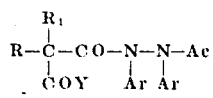

wherein

Ar indicates a member selected from the group consisting of phenyl, chloro- or bromo-substituted phenyl, lower alkyl and lower alkoxy substituted phenyl;

Ac is a member selected from the group consisting of lower alkanoyl, chloro- or bromo-substituted lower alkanoyl, alpha-carb-(lower) alkoxy-lower alkanoyl, benzoyl, and carbobenzyloxy;

Y indicates a member selected from the group consisting of chlorine, bromine, hydroxyl, lower alkoxy and benzyloxy;

R and $R_1$ each one indicates a member selected from the group consisting of hydrogen, alkyl, alkenyl cycloalkyl, cycloalkenyl, such alkyl, and cycloalkenyl having between two carbon atoms of their molecule a member selected from the group consisting of oxygen, sulfur, and nitrogen, said alkyl and said alkenyl being lower alkyl and lower alkenyl, respectively, said cycloalkyl and cycloalkenyl having not more than six carbon atoms in the ring, phenyl, phen-(lower alkyl), in which said two groups, the phenyl radical is substituted by chloro- or bromo, hydroxyl, lower alkoxy nitro or amino.

2. The malonic acid hydrazide compound according to claim 1, wherein
Ar is phenyl,
Ac is α-carbethoxy caproyl,
Y is ethoxy,
R is hydrogen, and
$R_1$ is n-butyl.

3. The malonic acid hydrazide compound according to claim 1, wherein
Ar is phenyl,
Ac is acetyl,
Y is ethoxy,
R is hydrogen, and
$R_1$ is n-butyl.

4. The malonic acid hydrazide compound according to claim 1, wherein
Ar is phenyl,
Ac is caproyl,
Y is ethoxy,
R is hydrogen, and
$R_1$ is n-butyl.

5. The malonic acid hydrazide compound according to claim 1, wherein
Ar is phenyl,
Ac is acetyl,
Y is hydroxyl,
R is hydrogen, and
$R_1$ is n-butyl.

6. The malonic acid hydrazide compound according to claim 1, wherein
Ar is phenyl,
Ac is benzoyl,
Y is ethoxy,
R is hydrogen, and
$R_1$ is n-butyl.

7. The malonic acid hydrazide compound according to claim 1, wherein
Ar is phenyl,
Ac is carbobenzyloxy,
Y is ethoxy,
R is hydrogen, and
$R_1$ is n-butyl.

8. The malonic acid hydrazide compound according to claim 1, wherein
Ar is phenyl,
Ac is benzoyl,
Y is hydroxyl,
R is hydrogen, and
$R_1$ is n-butyl.

9. The malonic acid hydrazide compound according to claim 1 wherein Ac is chloro-or bromo-substituted lower alkanoyl.

10. The malonic acid hydrazide compound according to claim 9, wherein the lower alkanoyl is acetyl.

11. The malonic acid hydrazide compound according to claim 10 wherein the acetyl group is dichloro-substituted.

12. The malonic acid hydrazide compound according to claim 1 wherein each Ar is phenyl and Ac is alphacarbethoxy lower alkanoyl.

13. The alkali metal salts of the malonic acid hydrazide compound of the formula $$R_1-\underset{\underset{COOX}{|}}{\overset{\overset{R}{|}}{C}}-CO-\underset{\underset{Ar}{|}}{N}-\underset{\underset{Ar}{|}}{N}-R_2$$

wherein
Ar indicates a member selected from the group consisting of phenyl, chloro- or bromo-substituted phenyl, lower alkyl and lower alkoxy substituted phenyl;
R indicates a member selected from the group consisting of hydrogen, alkyl, cycloalkyl, cycloalkenyl, such alkyl, and cycloalkenyl having between two carbon atoms of their molecule a member selected from the group consisting of oxygen, sulfur, and nitrogen, said alkyl and said alkenyl being lower alkyl and lower alkenyl, respectively, said cycloalkyl and cycloalkenyl having not more than six carbon atoms in the ring, phenyl, phen-(lower alkyl), in which said two groups, the phenyl radical is substituted by chloro- or bromo, hydroxyl, lower alkoxy, nitro, amino, and di-lower alkylamino.
$R_2$ indicates a member selected from the group consisting of hydrogen, lower alkanoyl, benzoyl, alpha-carb-(lower) alkoxy lower alkanoyl, and carbobenzyloxy, and
X indicates an alkali metal.

14. The alkali metal salts according to claim 13, wherein X is sodium.

15. The alkali metal salt according to claim 13, wherein
Ar is phenyl,
R is hydrogen,
$R_1$ is butyl,
$R_2$ is hydrogen, and
X is sodium.

16. The malonic acid hydrazide compound of the formula $$\underset{CH_3}{\overset{CH_3}{\diagdown}}CH-(CH_2)_n-\underset{\underset{COOH}{|}}{\overset{\overset{H}{|}}{C}}-CO-N-NH\text{(diphenyl)}$$

wherein
n indicates the numerals 1 and 2.

17. The N-(α-carboxy capryl)-N,N'-diphenyl hydrazide of the formula $$CH_3-CH_2-CH_2-CH_2-CH_2-CH_2-\underset{\underset{COOH}{|}}{\overset{\overset{H}{|}}{C}}-CO-N-NH\text{(diphenyl)}$$

18. In a process of producing malonic acid hydrazide compounds of the formula $$R_1-\underset{\underset{COY}{|}}{\overset{\overset{R}{|}}{C}}-CO-\underset{\underset{Ar}{|}}{N}-\underset{\underset{Ar}{|}}{N}-R_2$$

wherein
Ar indicates a member selected from the group consisting of phenyl, chloro- or bromo substituted phenyl, lower alkyl substituted phenyl, and lower alkoxy substituted phenyl;
R and $R_1$
each one indicates a member selected from the group consisting of hydrogen, alkyl, alkenyl, cycloalkyl, cycloalkenyl, such alkyl, alkenyl, cycloalkyl, and cycloalkenyl having between two carbon atoms of their molecule a member selected from the group consisting of oxygen, sulfur, and nitrogen, said alkyl and said alkenyl being lower alkyl and lower alkenyl, respectively, said cycloalkyl and cycloalkenyl having not more than six carbon atoms in the ring, phenyl, phen-(lower alkyl), in which said two groups, the phenyl radical is substituted by chloro- or bromo, hydroxyl, lower alkoxy, nitro, amino, and di-lower alkylamino;
$R_2$ indicates a member selected from the group consisting of hydrogen, lower-alkanoyl, chloro- or bromo- substituted lower alkanoyl, benzoyl, alpha lower carbalkoxy lower alkanoyl, and carbobenzyloxy, and
Y indicates a member selected from the group consisting of hydroxyl, lower alkoxy, benzyloxy, and an alkali metal,
the step which consists in selectively condensing a malonic acid compound of the formula $$R_1-\underset{\underset{COY_1}{|}}{\overset{\overset{R}{|}}{C}}-COX_1$$

wherein
R and $R_1$ represent the same members as indicated above,
$X_1$ is bromine or chlorine, and
$Y_1$ is a member selected from the group consisting of hydroxyl, lower alkoxy, and benzyloxy,
with a hydrazine compound of the formula $$\underset{\underset{Ar}{|}}{HN}-\underset{\underset{Ar}{|}}{N}-R_2$$

wherein
Ar represents the same member as indicated above, and
$R_2$ indicates a member selected from the group comprising hydrogen, lower alkanoyl, lower alpha-carbalkoxy lower alkanoyl, and carbobenzyloxy, and benzoyl,
in an inert solvent at a temperature not substantially exceeding 90° C., with the formation of a hydrogen halide and without reacting the $Y_1$ radical of the malonic acid starting compound, and thereby in the absence of the formation of byproducts therefrom.

19. The process according to claim 18, wherein the resulting condensation product is saponified when $Y_1$ is a substituent other than hydroxyl.

20. THe process according to claim 18, wherein condensation is effected in the presence of a basic agent binding the halogen halide set free during condensation.

21. The process according to claim 18, wherein condensation is effected in the presence of a tertiary amine to bind the hydrogen halide set free during condensation.

22. The process according to claim 18, wherein
$R_2$ in the hydrazine reactant is a chlorosubstituted lower alkanoyl.

23. The process according to claim 18, wherein $R_2$ in the hydrazine reactant is cloro acetyl.

24. The process according to claim 18, wherein $R_2$ in the hydrazone reactant is dichloro acetyl.

25. The process according to claim 18, wherein $R_2$ in the hydrazine reactant is alpha-lower-carbalkoxy lower alkanoyl.

26. In the process of producing a malonic acid hydrazide compound of the formula $$R_1-\underset{\underset{COOH}{|}}{\overset{\overset{R}{|}}{C}}-CO-\underset{\underset{Ar}{|}}{N}-\underset{\underset{Ar}{|}}{NH}$$

wherein

R and R₁
each one indicates a member selected from the group consisting of hydrogen, alkyl, alkenyl, cycloalkyl, cycloalkenyl, such alkyl, alkenyl, cycloalkyl, and cycloalkenyl having between two carbon atoms of their molecule a member selected from the group consisting of oxygen, sulfur, and nitrogen, said alkyl and said alkenyl being lower alkyl and lower alkenyl, respectively, said cycloalkyl and cycloalkenyl having not more than six carbon atoms in the ring, phenyl, phen-(lower alkyl), in which said two groups, the phenyl radical is substituted by chloro- or bromo, hydroxyl, lower alkoxy, nitro, amino, and di-lower alkylamino, Ar indicates a member selected from the group consisting of phenyl, chloro- or bromo- substituted phenyl, lower alkyl substituted phenyl, and lower alkoxy substituted phenyl, the step which comprises selectively saponifying a malonic acid hydrazide compound of the formula wherein R, R₁, and Ar are the same members as indicated above, R₂ indicates a member selected from the group consisting of

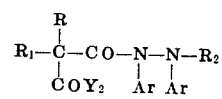

hydrogen, alkanoyl, alpha-carbalkoxy alkanoyl, and carbobenzyloxy, and benzoyl, and Y₂ is a member selected from the group consisting of lower alkoxy and benzyloxy by converting the group -COY₂ selectively into the carboxyl group and without splitting off the malonic acid residue then replacing by hydrogen the substituent R₂, when R₂ is other than hydrogen.

27. The process according to claim 26, wherein saponification is effected by heating the starting malonic acid hydrazide compound in an aqueous alcoholic alkali metal hydroxide solution.